US010827111B2

(12) United States Patent
Ishii

(10) Patent No.: US 10,827,111 B2
(45) Date of Patent: Nov. 3, 2020

(54) IMAGING APPARATUS HAVING SETTABLE FOCUS DETECTION AREAS AND METHOD FOR CONTROLLING THE SAME

(71) Applicant: CANON KABUSHIKI KAISHA, Tokyo (JP)

(72) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/514,723

(22) Filed: Jul. 17, 2019

(65) Prior Publication Data

US 2019/0342488 A1 Nov. 7, 2019

Related U.S. Application Data

(62) Division of application No. 15/604,213, filed on May 24, 2017, now Pat. No. 10,382,664.

(30) Foreign Application Priority Data

May 31, 2016 (JP) ................. 2016-109444

(51) Int. Cl.
*H04N 5/232* (2006.01)
*H04N 5/369* (2011.01)
*H04N 5/225* (2006.01)

(52) U.S. Cl.
CPC ....... *H04N 5/23212* (2013.01); *H04N 5/3696* (2013.01); *H04N 5/36961* (2018.08)

(58) Field of Classification Search
CPC ........... H04N 5/23212; H04N 5/36961; H04N 5/3696; H04N 5/2254; H04N 5/2253
See application file for complete search history.

(56) References Cited

U.S. PATENT DOCUMENTS

| 2002/0158973 A1* | 10/2002 | Gomi | H04N 5/23293 348/240.2 |
| 2008/0136950 A1* | 6/2008 | Nakajima | H04N 5/3456 348/294 |
| 2013/0076972 A1* | 3/2013 | Okita | H04N 5/23212 348/360 |
| 2014/0293115 A1* | 10/2014 | Sambonsugi | H04N 5/23212 348/349 |
| 2015/0124129 A1* | 5/2015 | Aoki | G03B 13/36 348/280 |

FOREIGN PATENT DOCUMENTS

| CN | 102236148 A | 11/2011 |
| CN | 103108193 A | 5/2013 |

(Continued)

*Primary Examiner* — Albert H Cutler
(74) *Attorney, Agent, or Firm* — Canon U.S.A., Inc., IP Division

(57) ABSTRACT

An imaging apparatus includes an image sensor including a pair of photoelectric conversion units for each of a plurality of microlenses arranged in a matrix of rows and columns, and capable of reading a signal from each row. According to a size of a focus detection area, a camera control unit regularly sets on the image sensor a first area having as many rows in which signals for use in focus detection are read from the image sensor as a first predetermined number of rows, and a second area having as many rows in which signals for use in focus detection are not read as a second predetermined number of rows.

8 Claims, 12 Drawing Sheets

(56) References Cited

FOREIGN PATENT DOCUMENTS

| | | |
|---|---|---|
| CN | 103685916 A | 3/2014 |
| CN | 105210363 A | 12/2015 |
| CN | 105282431 A | 1/2016 |
| JP | 2013-218204 A | 10/2013 |
| JP | 2014-215551 A | 11/2014 |

* cited by examiner

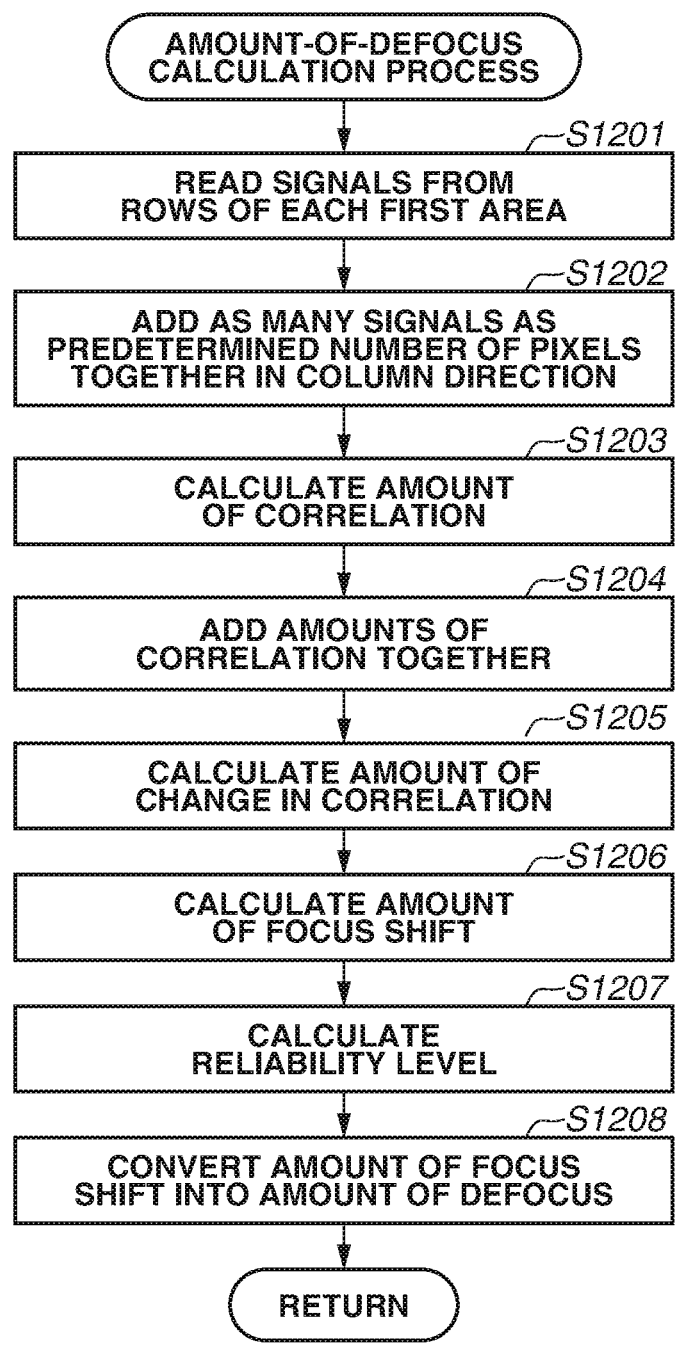

IMAGING APPARATUS HAVING SETTABLE FOCUS DETECTION AREAS AND METHOD FOR CONTROLLING THE SAME

CROSS-REFERENCE TO RELATED APPLICATIONS

The present is a Divisional of co-pending U.S. patent application Ser. No. 15/604,213 filed May 24, 2017, which claims foreign priority benefit from Japanese Patent Application No. 2016-109444 filed May 31, 2016, the disclosures of which are hereby incorporated by reference herein in their entirety.

BACKGROUND OF THE INVENTION

Field of Invention

The present invention relates to focus detection control of an imaging apparatus, and also relates to a method for controlling an imaging apparatus.

Description of Related Art

A technique for performing imaging plane phase difference focus detection using signals output from an image sensor is known. The publication of Japanese Patent Application Laid-Open No. 2016-015695 (a third exemplary embodiment therein) discusses an example of a technique for performing imaging plane phase difference focus detection. In this technique, a predetermined number of rows, in which signals for use in focus detection, are read and a predetermined number of rows in which signals for use in focus detection are not read, and signals for imaging are read are mixed together in a column direction, and the signals are alternately read. This limits the number of rows in which signals for use in focus detection are read. Thus, it is possible to shorten the time required to read one frame from the image sensor.

Further, the publication of Japanese Patent Application Laid-Open No. 2012-155095 discusses a case where an area where a desired object is brought into focus is set, and signals for use in focus detection are output from pixel portions of an image sensor that correspond to this area. From pixel portions of the image sensor that do not correspond to the area where a desired object is brought into focus, signals for use in focus detection are not read, and signals for use in generating an image to be displayed and recorded are read (output). Consequently, in this case too, it is possible to shorten the time required to read one frame from the image sensor.

In the publication of Japanese Patent Application Laid-Open No. 2016-015695, however, if a main object does not overlap an area where signals for use in focus detection are read, it is not possible to perform focus detection. FIG. 12 is a diagram illustrating the above situation found by the inventor where shaded areas 1502 are areas where signals for use in focus detection are read, and a focus detection area 1500 is an area where an object 1501 is desired to be brought into focus.

SUMMARY OF THE INVENTION

The various aspects of the present invention disclose an imaging apparatus less likely to cause the deficiencies described above, and a method for controlling an imaging apparatus.

According to an aspect of the present invention, an imaging apparatus includes an image sensor, a first setting unit configured to set a size of a focus detection area, and a second setting unit configured to set on the image sensor a plurality of first areas for reading a focus detection signal from the image sensor and a plurality of second areas where the focus detection signal is not read, by arranging each first area alternately with each second area, and change intervals between the first areas according to the size of the focus detection area set by the first setting unit.

According to another aspect of the present invention, an imaging apparatus includes an image sensor including a pair of photoelectric conversion units for each of a plurality of microlenses arranged in a matrix of rows and columns, and capable of reading a signal from each row, a reading control unit configured to perform control so that a plurality of first areas each having a first predetermined number of rows in which signals used for focus detection are read when signals are read from the image sensor, and a plurality of second areas each having a second predetermined number of rows in which signals for use in focus detection are not read, are set by arranging each first area alternately with each second area on the image sensor, and a detection unit configured to perform phase difference focus detection using, among signals read by a first reading control for reading signals for use in focus detection, a pair of focus detection signals obtained from an area on the image sensor corresponding to a set focus detection area, wherein in a case where a second focus detection area larger in a column direction than a first focus detection area is set without changing the number of rows in which signals are read from the image sensor by the first reading control, the reading control unit makes a number of the first areas larger than in a case where the first focus detection area is set, and reduces the number of rows in which signals are read by the first reading control in each of the first areas, thereby making the first area smaller in the column direction than in the case where the first focus detection area is set.

According to yet another aspect of the present invention, an imaging apparatus includes an image sensor including a pair of photoelectric conversion units for each of a plurality of microlenses arranged in a matrix of rows and columns, and capable of reading a signal from each row, a reading control unit configured to perform control so that a plurality of first areas each having a first predetermined number of rows in which signals used for focus detection are read by a first reading control when signals are read from the image sensor, and a plurality of second areas each having a second predetermined number of rows in which signals for use in focus detection are not read by the first reading control, are set by arranging each first area alternately with each second area on the image sensor, and a detection unit configured to perform phase difference focus detection using, among the signals read by the first reading control, a pair of focus detection signals obtained from an area on the image sensor corresponding to a set focus detection area, wherein the reading control unit sets a number of the first areas and a size in a column direction of each first area according to a size of the set focus detection area without changing the number of rows in which signals are read by the first reading control and without making each second area equal to or larger than a predetermined size in the column direction.

According to yet another aspect of the present invention, an imaging apparatus includes an image sensor including a pair of photoelectric conversion units for each of a plurality of microlenses arranged in a matrix of rows and columns, and capable of reading a signal from each row, a reading control unit configured to perform control so that a first area having a first predetermined number of rows in which signals used for focus detection are read by a first reading control when signals are read from the image sensor, and a second area having a second predetermined number of rows in which signals for use in focus detection are not read by the first reading control, are regularly set on the image sensor, and a detection unit configured to perform phase difference focus detection using, among the signals read by the first reading control, a pair of focus detection signals obtained from an area on the image sensor corresponding to a set focus detection area, wherein in a case where the number of rows in which signals are read from the image sensor by the first reading control is not changed, and in a case where a second focus detection area larger in a column direction than a first focus detection area is set, the reading control unit continuously arranges a plurality of the first areas without changing, from a case where the first focus detection area is set, the number of rows in which signals are read by the first reading control in each of the first areas.

According to yet another aspect of the present invention, an imaging apparatus includes an image sensor including a pair of photoelectric conversion units for each of a plurality of microlenses arranged in a matrix of rows and columns, and capable of reading a signal from each row, a reading control unit configured to perform control so that a first area having a first predetermined number of rows in which signals used for focus detection are read by a first reading control for reading signals from the image sensor, and a second area having a second predetermined number of rows in which signals for use in focus detection are not read by the first reading control, are regularly set on the image sensor, and a detection unit configured to perform phase difference focus detection using, among the signals read by the first reading control, a pair of focus detection signals obtained from an area on the image sensor corresponding to a set focus detection area, wherein in a case where the number of rows in which signals are read from the image sensor by the first reading control is not changed, the reading control unit continuously arranges a plurality of the first areas without changing, according to a size of the set focus detection area, the number of rows in which signals are read from the image sensor by the first reading control and the number of rows in which signals are read by the first reading control in each of the first areas.

Further features of the present invention will become apparent from the following description of exemplary embodiments with reference to the attached drawings.

BRIEF DESCRIPTION OF THE DRAWINGS

FIGS. 2A and 2B are diagrams illustrating a partial area of an image sensor.

FIG. 9 is a diagram illustrating an amount-of-defocus calculation process (a sub-flow) in the second exemplary embodiment.

DESCRIPTION OF THE EMBODIMENTS

[Configuration of Camera 100]

A first exemplary embodiment of the present invention is described below. A description is given of an imaging apparatus as an example of a focus detection apparatus according to exemplary embodiments of the present invention. In the first exemplary embodiment, an example is described where the imaging apparatus is a video camera. The imaging apparatus, however, is not limited to a video camera, and may be another imaging apparatus such as a digital still camera. Alternatively, the imaging apparatus may be an imaging apparatus to and from which a lens device is attachable and detachable.

Figure 1:
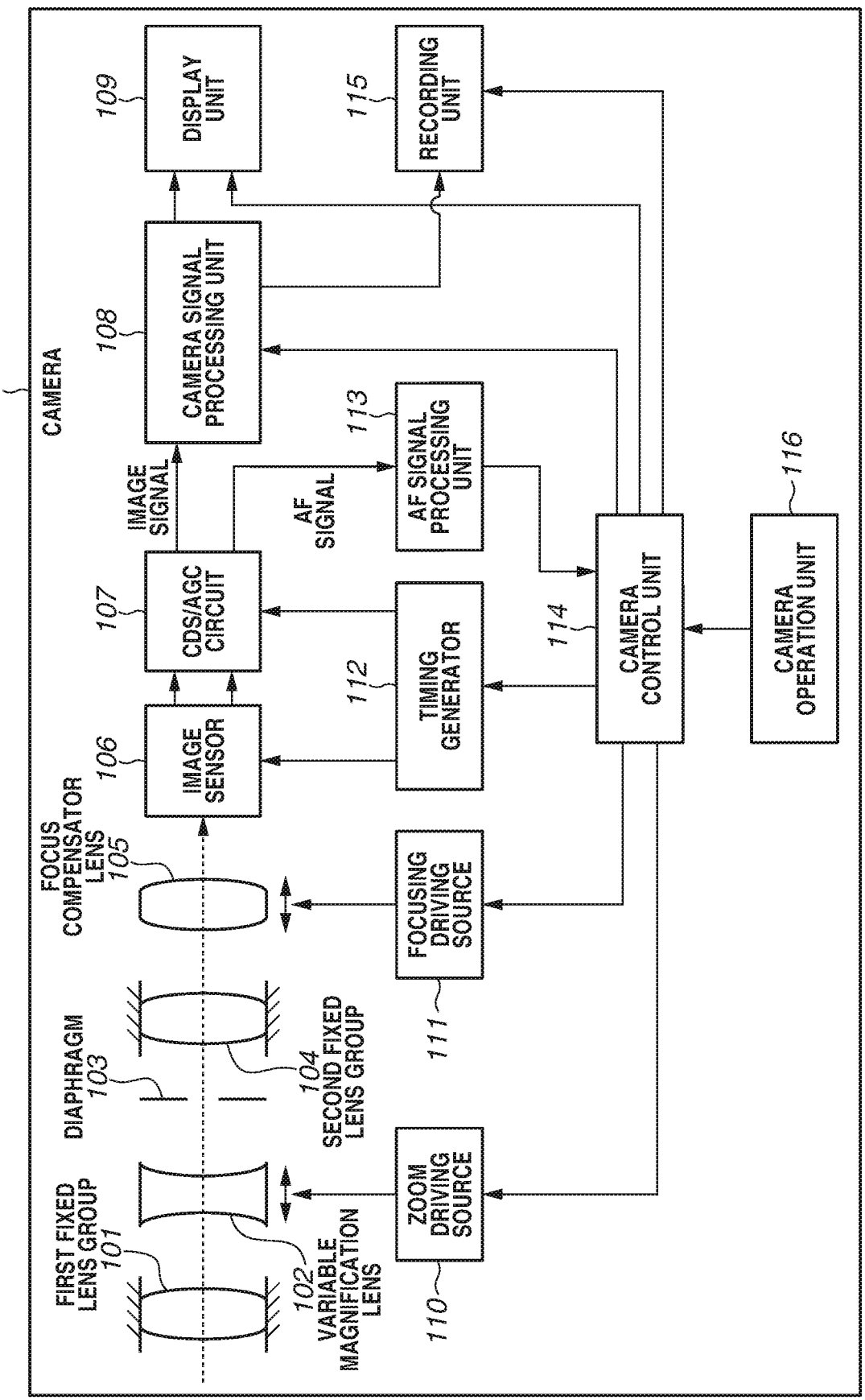
FIG. 1 is a block diagram illustrating a configuration of an imaging apparatus.

FIG. 1 is a block diagram illustrating the configuration of a camera 100 as an example of an imaging apparatus according to the first exemplary embodiment.

The camera 100 includes as an imaging optical system a first fixed lens group 101, a variable magnification lens 102, a diaphragm 103, a second fixed lens group 104, and a focus lens 105 (a focus compensator lens). The variable magnification lens 102 is moved in the optical axis direction to change the magnification, whereby the focal length can be changed. The focus lens 105 has both the function of correcting the movements of the focal planes according to a change in the magnification, and a focusing function. The first fixed lens group 101 and the second fixed lens group 104 do not move during focusing or magnification variation.

A zoom driving source 110 is a driving source for moving the variable magnification lens 102. A focusing driving source 111 is a driving source for moving the focus lens 105. Each of the zoom driving source 110 and the focusing driving source 111 includes an actuator such as a stepping motor, a direct-current (DC) motor, a vibration motor, or a voice coil motor.

Further, the camera 100 includes an image sensor 106, a correlated double sampling/automatic gain control (CDS/AGC) circuit 107, a camera signal processing unit 108, an autofocus (AF) signal processing unit 113, a display unit 109, a recording unit 115, a camera control unit 114, and a camera operation unit 116.

The image sensor 106 is a member serving as an image sensor and includes a charge-coupled device (CCD) or complementary metal-oxide-semiconductor (CMOS) sensor. The image sensor 106 includes a plurality of pixel portions in a matrix of rows and columns. Each of the pixel portions corresponds to a single microlens. A light beam passing through the imaging optical system forms an image on a light-receiving surface of the image sensor 106, and the image is converted into signal charges according to the amounts of incident light by photodiodes (photoelectric conversion units) included in the respective pixel portions.

The signal charges accumulated in the respective photodiodes are sequentially read as voltage signals according to the signal charges from the image sensor 106 based on driving pulses provided by a timing generator 112 according to an instruction from the camera control unit 114. The image sensor 106 according to the first exemplary embodiment can output an image signal and a focus detection signal. The details will be described below.

The image signal and the focus detection signal read from the image sensor 106 are input to the CDS/AGC circuit 107, which performs sampling and gain adjustment. Then, the CDS/AGC circuit 107 outputs an image signal to the camera signal processing unit 108 and outputs focus detection signals to the AF signal processing unit 113.

The camera signal processing unit 108 performs various types of image processing on the image signal output from the CDS/AGC circuit 107, thereby generating an image signal. An image signal according to the first exemplary embodiment is a signal of a still image or a moving image to be recorded.

The display unit 109, which includes a liquid crystal display (LCD), displays as a display image the image signal output from the camera signal processing unit 108.

The recording unit 115 records the image signal from the camera signal processing unit 108 in a recording medium such as a magnetic tape, an optical disc, or a semiconductor memory.

The AF signal processing unit 113 performs a correlation calculation using the focus detection signals (two image signals having parallax) output from the CDS/AGC circuit 107. The AF signal processing unit 113 calculates the amount of correlation (the amount of image shift), the amount of defocus, reliability information (the degree of coincidence between two images, the degree of steepness between two images, contrast information, saturation information, and scratch information). The AF signal processing unit 113 outputs the calculated amount of defocus and reliability information to the camera control unit 114. Further, based on the acquired amount of defocus and reliability information, the camera control unit 114 performs control to change the settings of the AF signal processing unit 113. The correlation calculation is a known calculation, and is not described in the first exemplary embodiment.

The camera control unit 114 governs the control of the operation of the entirety of the camera 100 and also performs AF control for controlling the focusing driving source 111 to move the focus lens 105. Further, according to an input from the camera operation unit 116, the camera control unit 114 executes various camera functions operated by a user, such as changing the position and the size of a focus detection area, turning on or off the camera 100, changing a setting, starting recording, starting AF control, and confirming a recorded video image.

[Image Sensor 106]

Figures 2A, 2B:
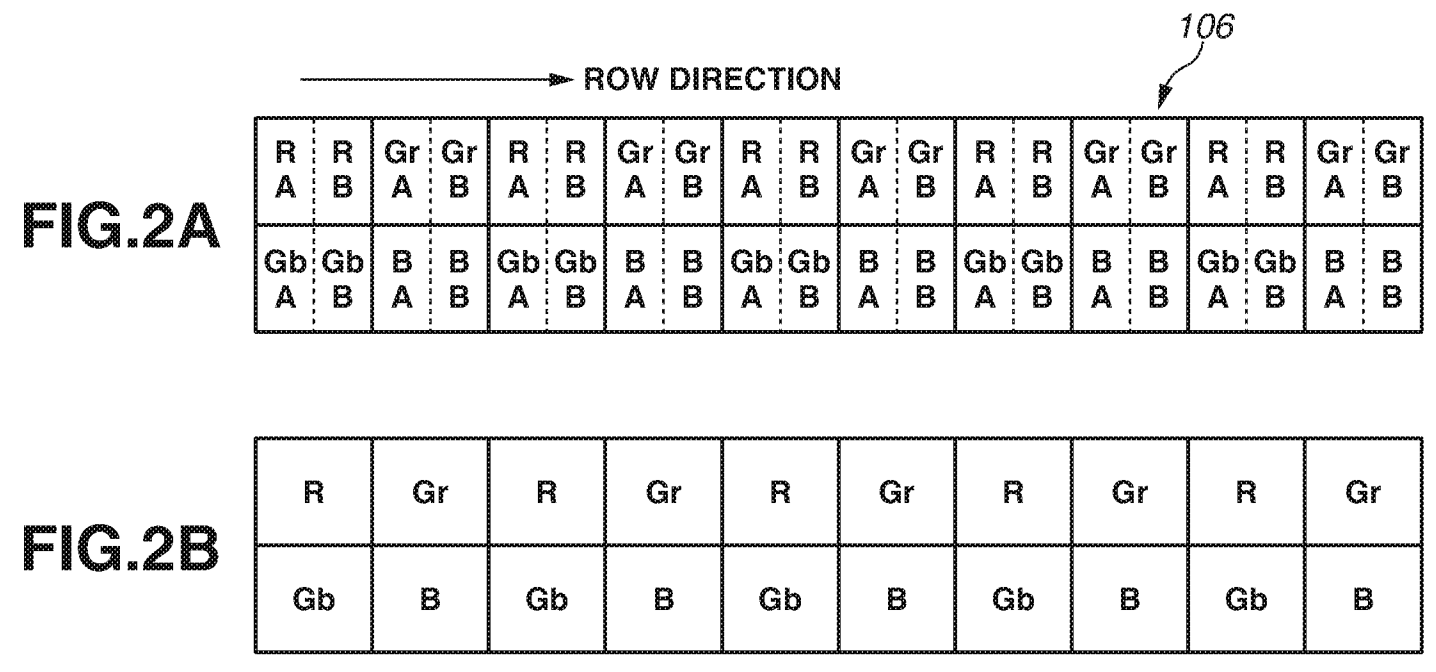

FIG. 2A illustrates a part of the light-receiving surface of the image sensor 106. The image sensor 106 includes a pair of photodiodes (photodiodes A and B) for a single pixel portion (which corresponds to a single microlens (not illustrated)), and these pixel portions are arranged in an array on the image sensor 106. Consequently, the pixel portions can receive light beams passing through different areas of an exit pupil of the imaging optical system. That is, an A-image signal acquired from the photodiode A and a B-image signal acquired from the photodiode B have parallax. Thus, it is possible to perform imaging plane phase difference focus detection separately using the A-image signal and the B-image signal read from the image sensor 106. That is, the AF signal processing unit 113 performs a correlation calculation based on the A-image signal and the B-image signal, thereby calculating the amount of defocus and various pieces of information such as reliability information.

Further, the A-image signal acquired from the photodiode A and the B-image signal acquired from the photodiode B are added together, whereby an image signal (the A-image signal+the B-image signal) to be recorded can be output.

In the first exemplary embodiment, an image signal (the A-image signal+the B-image signal) and a focus detection signal (the A-image signal) are output from the image sensor 106, and a focus detection signal (the B-image signal) is generated based on the image signal (the A-image signal+the B-image signal) and the focus detection signal (the A-image signal). The present invention, however, is not limited to such a method so long as an image signal and focus detection signals can be obtained. Alternatively, for example, an image signal (the A-image signal+the B-image signal) and a focus detection signal (the B-image signal) may be read. Yet alternatively, a first focus detection signal (the A-image signal) and a second focus detection signal (the B-image signal) may be read and then added together later, thereby generating an image signal (the A-image signal+the B-image signal).

Further, FIG. 2A illustrates an example where pixel portions, each having two photodiodes for a single microlens (microlens not shown), are arranged in an array of rows and columns to form a matrix. Alternatively, pixel portions, each having three or more photodiodes for a single microlens, may be arranged in an array. Yet alternatively, a plurality of pixel portions of which light-receiving portions have different aperture positions may be included for a microlens. That is, it is only necessary to, as a result, obtain two focus detection signals such as the A-image signal and the B-image signal for allowing the detection of phase difference focus detection and an image signal from the image sensor 106.

FIG. 2B schematically illustrates the arrangement of color filters included in the respective pixels of the image sensor 106, and the color filters are placed in the Bayer arrangement based on red (R), blue (B), and green (Gb, Gr) patterns.

[AF Control Process]

Next, an AF control process executed by the camera control unit 114 is described.

Figure 3:
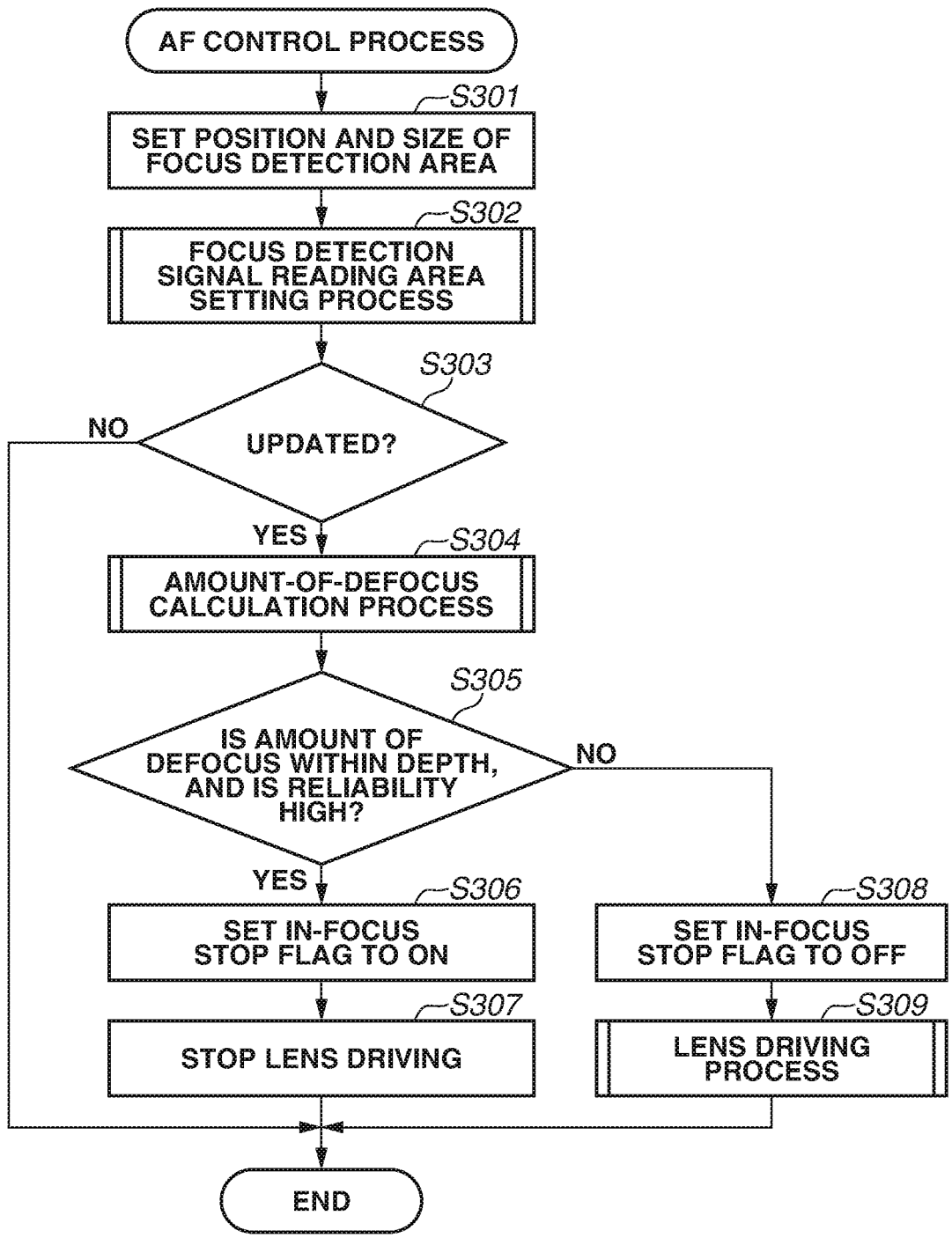
FIG. 3 is a diagram illustrating a flowchart of an autofocus (AF) control process.

FIG. 3 is a flowchart illustrating an AF control process executed by the camera control unit 114 in FIG. 1. This processing is executed according to a computer program stored in the camera control unit 114.

Further, this processing is executed, for example, in the cycle (every vertical synchronization period) of reading an image signal from the image sensor 106 for generating a one-field image (hereinafter referred to also as "one frame" or "one screen"). Alternatively, this processing may be repeated multiple times in a vertical synchronization period (a V-rate).

First, in step S301, the camera control unit 114 (a setting unit) sets the position and the size of a focus detection area.

In step S302, the camera control unit 114 executes a focus detection signal reading area setting process on the focus detection area set in step S301. The details of the focus detection signal reading area setting process will be described below with reference to a sub-flow in FIG. 5.

In step S303, the camera control unit 114 determines whether an AF signal is updated. If the camera control unit 114 determines that the AF signal is updated (YES in step S303), then in step S304, the AF signal processing unit 113 executes an amount-of-defocus calculation process. The details of the amount-of-defocus calculation process will be described below with reference to a sub-flow in FIG. 7. If, on the other hand, the camera control unit 114 determines in step S303 that the AF signal is not updated (NO in step S303), the processing of this flow ends.

In step S305, the camera control unit 114 determines whether the amount of defocus calculated in step S304 is within a predetermined depth, and the reliability level of the amount of defocus is higher than a predetermined level, i.e., the amount of defocus is reliable. If the camera control unit 114 determines that the amount of defocus is within the predetermined depth, and the reliability of the amount of defocus is higher than the predetermined level (YES in step S305), then in step S306, the camera control unit 114 sets an in-focus stop flag to on. If the camera control unit 114 determines that the condition that the amount of defocus is within the predetermined depth, and the reliability of the amount of defocus is higher than the predetermined level is not satisfied (NO in step S305), then in step S308, the camera control unit 114 sets the in-focus stop flag to off. The state where the in-focus stop flag is on indicates the state where the focus is controlled to be at an in-focus position, and the control of the focus should be stopped.

The reliability level of the amount of defocus is defined such that in a case where it can be determined that the accuracy of the calculated amount of defocus is credible, the reliability level is "high", and in a case where a defocus direction indicating the direction in which a focus position may exist is credible, the reliability level is "medium". For example, the case where the reliability level of the amount of defocus is "high" is a case where the level of the degree of coincidence between two images calculated by the AF signal processing unit 113 is equal to or greater than a predetermined value. This corresponds to, for example, a case where the contrast between the A-image signal and the B-image signal is high, and the shapes of the A-image signal and the B-image signal are similar (the level of the degree of coincidence between two images is high), or a case where a main object image is already in focus. In this case, driving is performed relying on the amount of defocus.

The case where the reliability level of the amount of defocus is "medium" is the state where the level of the degree of coincidence between two images calculated by the AF signal processing unit 113 is lower than the predetermined value, but there is a certain tendency in the correlation obtained by shifting the A-image signal and the B-image signal relative to each other, and the defocus direction is reliable. This determination is often made, for example, in the state where a main object is slightly blurred. Further, in a case where both the amount of defocus and the defocus direction are unreliable, the camera control unit 114 determines that the reliability level is low. This corresponds to, for example, the state where the contrast between the A-image signal and the B-image signal is low, and the level of the degree of coincidence between two images is also low. This determination is often made in the state where an object is greatly blurred. In this state, it is difficult to calculate the amount of defocus.

In step S307, according to the fact that the in-focus stop flag is on (the amount of defocus is within the predetermined depth, and the reliability of the amount of defocus is high), the camera control unit 114 stops lens driving for controlling the focus. Then, the processing of this flow ends.

If, on the other hand, the in-focus stop flag is set to off in step S308, then in step S309, a lens driving process is performed. Then, the processing of this flow ends. The details of the lens driving process will be described below with reference to a sub-flow in FIG. 4.

Figure 5:
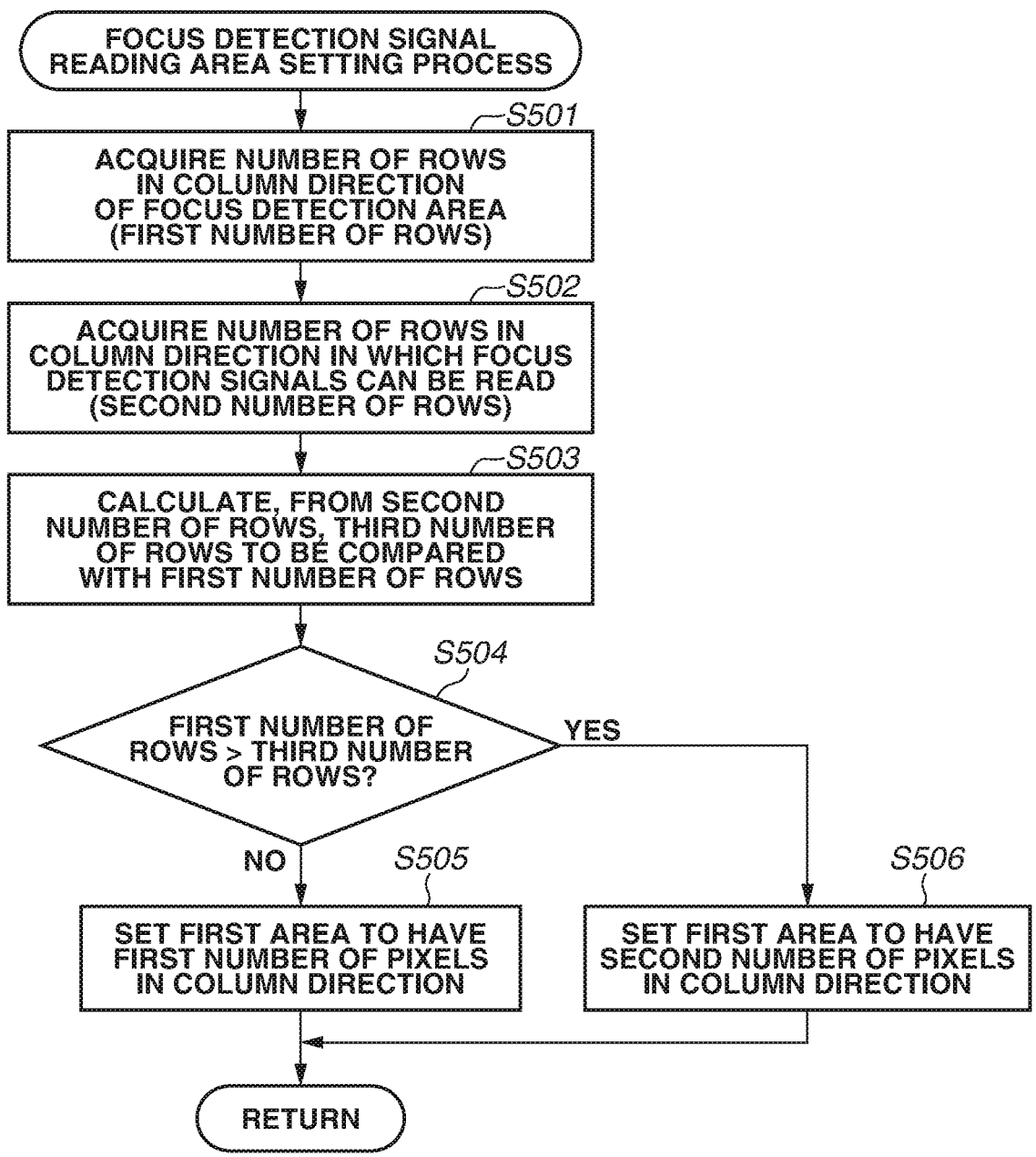
FIG. 5 is a diagram illustrating a focus detection signal reading area setting process (a sub-flow).

[Focus Detection Signal Reading Area Setting Process] [Flow in FIG. 5]

FIG. 5 is a sub-flow illustrating the details of the focus detection signal reading area setting process (step S302) in FIG. 3.

First, in step S501, the camera control unit 114 acquires the size in the column direction of the focus detection area set in step S301. At this time, the camera control unit 114 acquires, as the size in the column direction of the focus detection area, the number of rows in the column direction of the focus detection area (hereinafter referred to as a "first number of rows"). That is, the first number of rows describes the size in pixels in the column direction of the focus detection area.

In step S502, the camera control unit 114 acquires the number of rows in the column direction of areas where focus detection signals are read in the focus detection area (hereinafter referred to as a "second number of rows"). That is, the second number of rows describes the number of rows in the column direction of areas where focus detection signals are read within the focus detection area (for example, total number of rows of areas 602a to 602l). The second number of rows differs depending on the image capture mode and the frame rate. For example, the second number may be smaller, when the frame rate is higher, to reduce the time to read the focus detection signal.

In step S503, the camera control unit 114 calculates a third number of rows (described below) based on the second number of rows. The third number of rows is a threshold for the camera control unit 114 to determine whether the first number of rows is greater than a predetermined size with respect to the second number of rows. Thus, it is desirable to calculate the third number of rows according to the second number of rows.

Then, in step S504, the camera control unit 114 compares the first number of rows with the third number of rows.

If the camera control unit 114 determines that the first number of rows is less than or equal to the third number of rows (NO in step S504), then in step S505, the camera control unit 114 sets an area (first area) on the image sensor 106 where focus detection signals are read within the focus detection area to an area continuous by a first number of pixels in the column direction.

In the focus detection area, the first area includes as many rows in which the camera control unit 114 (a reading control unit) performs control for reading focus detection signals (first reading control) as a predetermined number of rows such that the rows are continuous in the column direction. On the other hand, an area where the camera control unit 114 performs control for reading only an image signal without reading signals for use in focus detection (second reading control) is referred to as a "second area". In the present exemplary embodiment, as described above, the number of rows in which the first reading control is performed on the image sensor 106 is desired to be limited to thereby shorten the time required to read one frame from the image sensor 106.

The reason why as many rows in which the first reading control is performed as the predetermined number of rows are made continuous in the column direction is as follows. That is, the signals acquired from the continuous rows are added later to calculate the amount of correlation. Thus, it is desirable that the obtained amount of correlation should have as close a correlation as possible. In contrast, if as many rows in which the first reading control is performed as the predetermined number of rows are not made continuous in the column direction, and these rows are discretely arranged, signals corresponding to different portions of an object are highly likely to be read from the respective rows and added together. If signals corresponding to different portions of an object are read and added together, it is highly likely that the amount of correlation corresponding to an intended portion of the object cannot be obtained. Thus, as many rows in which the first reading control is performed as the predetermined number of rows are made continuous in the column direction.

The camera control unit 114 (the reading control unit) controls the reading of signals so that each of a plurality of first areas and a plurality of second areas are set by arranging in the column direction each first area alternately with each second area.

If the camera control unit 114 determines that the first number of rows is greater than the third number of rows (YES in step S504), then in step S506, the camera control unit 114 sets the area (the first area) on the image sensor 106 where focus detection signals are read within the focus detection area (to an area continuous by a second number of pixels in the column direction. Also in this case, the focus detection area includes a plurality of first areas. The camera control unit 114 (the reading control unit) controls the reading of signals so that the plurality of first areas and a plurality of areas (second areas) where focus detection signals are not read within the focus detection area are set by alternately arranging each first area and each second area.
[Steps S505 and S506]

Figure 6A:
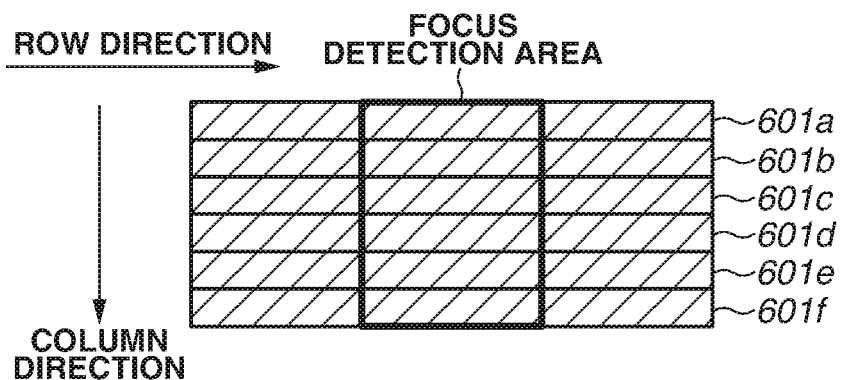
FIGS. 6A, 6B, and 6C are diagrams illustrating the focus detection signal reading area setting process in FIG. 5.
Figure 6B:
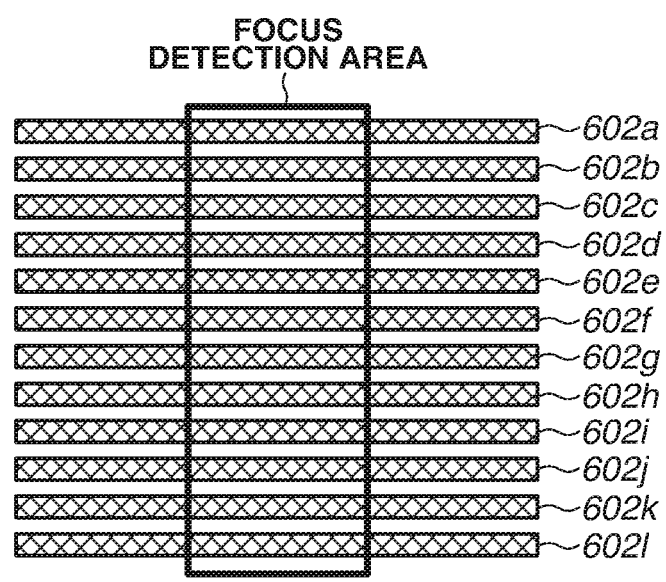
Figure 6C:
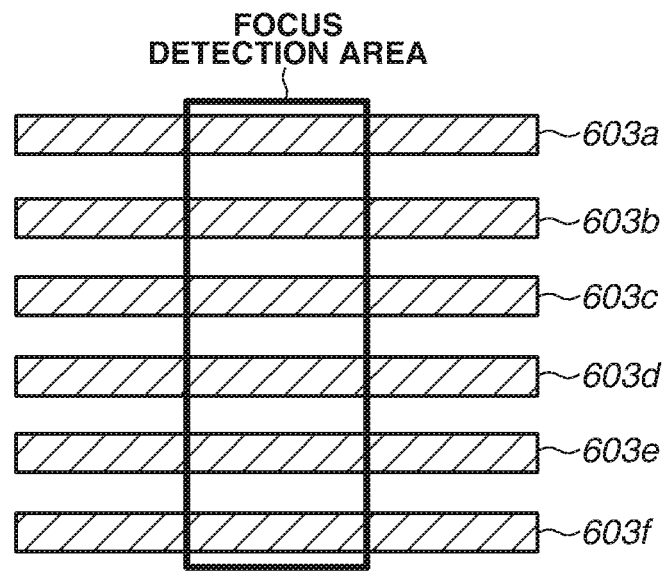

FIG. 6A to 6C are diagrams illustrating images in steps S505 and S506 in FIG. 5. For ease of description, as an example, the description is given on the assumption that the second number of rows is 96 rows, the third number of rows is 192 rows (twice the second number of rows), the first number of pixels is 16 pixels, and the second number of pixels is 8 pixels. These numbers, however, are not limited to this example so long as the numbers are consistent with the general scope of the present exemplary embodiment. Further, the first number of pixels only needs to be greater than the second number of pixels.
[Case Where First Number of Rows and Second Number of Rows Are the Same]

FIG. 6A is a diagram illustrating a case where as an example, when the first number of rows and the second number of rows are both 96 rows, the area (the first area) where focus detection signals are read from within the focus detection area is set to an area continuous by the first number of pixels in the column direction in step S505. In FIG. 6A, since the first number of rows and the second number of rows are equal, the area (the second area) where focus detection signals are not read from within the focus detection area is not included. Since the first number of pixels is 16 pixels at this time, six areas (first areas) 601a, 601b, 601c, 601d, 601e, and 601f where focus detection signals are read from within the focus detection area are included. That is, it is possible to detect a phase difference corresponding to each of the six areas (first areas) 601a-601f.
[Problem Assumed in Present Exemplary Embodiment]

With reference to FIG. 6C, a description is given of a problem that arises in a case where the first number of rows is greater than the third number of rows and the size of the area (the first area) where focus detection signals are read from within the focus detection area is not adjusted. In FIG. 6C, unlike step S506 in the present exemplary embodiment, the first areas 603a, 603b, 603c, 603d, 603e and 603f are set to an area having the first number of pixels in the column direction similarly to FIG. 6A. The greater the number of pixels in the column direction of the first area, the more easily the focus detection is performed on an object having low contrast using the obtained signals. Further, there is also an advantage in terms of the signal-to-noise (S/N) ratio. In terms of these, however, in a case where the focus detection area becomes larger in the column direction without reducing the number of pixels in the column direction of the first area and the number of first areas, the size in the column direction of the second areas (areas between 603a-603b, 603b-603, etc.) becomes larger, and an object is highly likely to enter the second area.

A case where the first number of rows is greater than the third number of rows in step S504 (YES in S504) is a case where it is determined that an object is highly likely to enter the second area. In the first exemplary embodiment, as an example, the third number of rows is twice the number of rows in the column direction in which focus detection signals are read (the second number of rows). In this case, if the first number of rows is greater than the third number of rows, the number of pixels in the column direction of the second area is greater than the number of pixels in the column direction of the first area. As described above, in a case where the first number of rows is greater than the third number of rows, and if the camera control unit 114 sets the first area on the image sensor 106 to an area continuous by the first number of pixels in the column direction, the second area, which is an area in the space between first areas, becomes relatively large. If an object having contrast enters the second area, which is a space, a phase difference cannot be detected (hereinafter referred to also as "object missing"). That is, it is not possible to perform focus detection on an object that should be subjected to focus detection. If it is possible to perform focus detection on an object that should be subjected to focus detection in a certain frame, and it is not possible to perform focus detection on the object in the next frame due to the fact that the object enters the second area, it is not possible to continue to stably bring the object into focus.
[Case Where First Number of Rows Is Greater Than Third Number of Rows]

Thus, in the present exemplary embodiment, the camera control unit 114 sets the first area and the second area in such a manner that the second area is not larger than or equal to a predetermined size. To solve the potential deficiencies described with reference to FIG. 6C, in the present exemplary embodiment, in a case where the first number of rows is greater than the third number of rows, the camera control unit 114 performs control so that the area (the first area) where focus detection signals are read from within the focus detection area is set to an area continuous by the second number of pixels in the column direction. FIG. 6B illustrates an example of the case where the first number of rows is greater than the third number of rows. Since the second number of pixels is assumed to be 8 pixels as described above, the focus detection area includes 12 areas (first areas) 602a to 602l where focus detection signals are read. In this case, the size in the column direction of the areas (second areas) where focus detection signals are not read from within the focus detection area, which is an area in the space between first areas, is smaller than in the case illustrated in FIG. 6C. That is, object missing is less likely to occur in the focus detection area of FIG. 6B than in the case illustrated in FIG. 6C. Thus, it is possible to perform more stable focusing in successive frames even if an object moves.

In the present exemplary embodiment, an example has been illustrated where the third number of rows is set so that the size in the column direction of the second areas is less than or equal to the size in the column direction of the first areas. As an example, the third number of rows is twice the second number of rows. The third number of rows, however, is not limited to this. The third number of rows may be calculated to obtain the size of the second areas according to the size of the object being focused on, so that it is possible to minimize or prevent the issue of object missing.

[Effects of Step S506]

As described above, in the present exemplary embodiment, in a case where the first number of rows is greater than the third number of rows, the number of pixels in the column direction of the first area is set to the second number of pixels that is smaller than the first number of pixels in a case where the first number of rows is less than or equal to the third number of rows. Consequently, it is possible to perform more stable focusing.

[Effects of Step S505]

On the other hand, in the present exemplary embodiment, in a case where the first number of rows is less than or equal to the third number of rows, the number of pixels in the column direction of the first area is set to the first number of pixels that is greater than the second number of pixels. The number of pixels in the column direction of the first area is thus made greater, thereby adding together more signals of rows continuous in the column direction. Signals of rows in which the same object is highly likely to be captured are added together, and the added signals are used to calculate the amount of correlation, whereby it is possible to maintain a high S/N ratio and facilitate the obtaining of the steepness of the amount of correlation (the details will be described below).

[Amount-of-Defocus Calculation Process]

Figure 7:
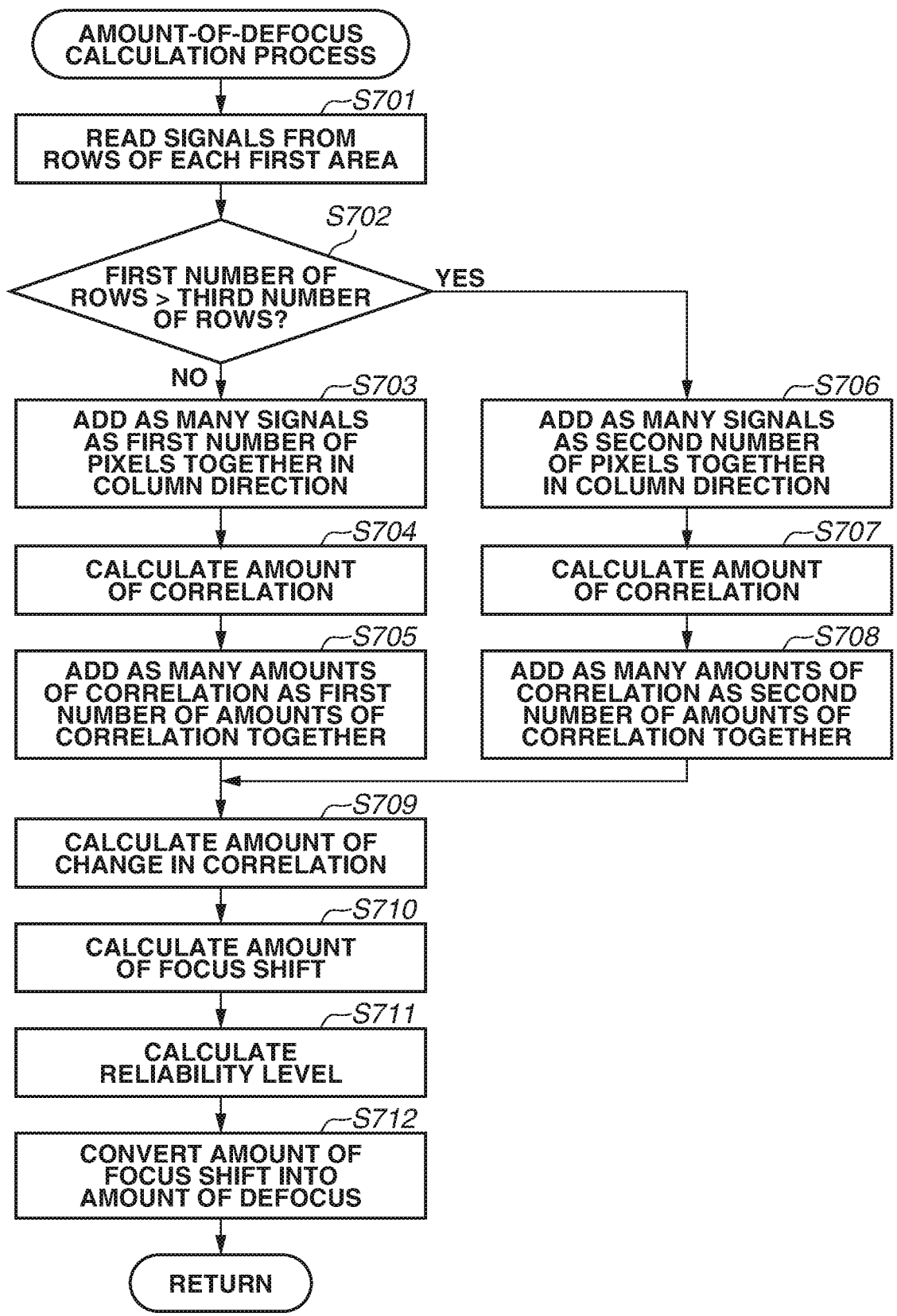
FIG. 7 is a diagram illustrating an amount-of-defocus calculation process (a sub-flow).

FIG. 7 is a flowchart illustrating the details of the amount-of-defocus calculation process (step S304) in FIG. 3.

In the present exemplary embodiment, the amount of defocus may be replaced by the absolute distance from the in-focus position or the number of pulses. Alternatively, the amount of defocus may be a concept different in dimension and unit from such a concept, or may be a concept relative to such a concept. The amount of defocus only needs to be a concept indicating that it can be determined how far from an in-focus state the current state is, and indicating that it can be determined how much focus control should be performed to enable the shifting to the in-focus state.

First, in step S701, the camera control unit 114 acquires focus detection signals (the A-image signal and the B-image signal) corresponding to the area where focus detection signals are read in the focus detection area (the first area).

Next, in step S702, the camera control unit 114 compares the first number of rows with the third number of rows.

If the first number of rows is less than or equal to the third number of rows (NO in step S702), then in step S703, the camera control unit 114 (a signal addition unit) performs control so that among the signals read from the rows of each first area, as many signals as the first number of pixels are added together in the column direction.

In step S704, based on the signals calculated by the addition in step S703, the AF signal processing unit 113 calculates the amount of correlation of each first area.

In step S705, among the plurality of amounts of correlation calculated regarding the respective first areas, the AF signal processing unit 113 adds as many amounts of correlation as a first number of amounts of correlation together. That is, in a case where as many signals as the first number of pixels are added together in the column direction in step S703, the first number of amounts of correlation coincides with the number of the first areas in the focus detection area.

If the first number of rows is greater than the third number of rows (YES in step S702), then in step S706, the camera control unit 114 performs control so that among the signals read from the rows of each first area, as many signals as the second number of pixels are added together in the column direction.

In step S707, based on the image signals calculated by the addition in step S706, the AF signal processing unit 113 calculates the amount of correlation of each first area.

In step S708, among the plurality of amounts of correlation calculated regarding the respective first areas, the AF signal processing unit 113 adds as many amounts of correlation as a second number of amounts of correlation together. That is, in a case where as many signals as the second number of pixels are added together in the column direction in step S706, the second number of amounts of correlation coincides with the number of the first areas in the focus detection area.

Then, in step S709, the AF signal processing unit 113 calculates the amount of change in correlation using the amounts of correlation calculated by the addition in step S705 or step S708. Then, in step S710, the AF signal processing unit 113 calculates the amount of focus shift from the calculated amount of change in correlation. The amount of change in correlation as used herein is known and discussed in the publication of Japanese Patent Application Laid-Open No. 2014-17446, for example.

Further, in step S711, the AF signal processing unit 113 calculates a reliability level indicating how reliable the calculated amount of focus shift is.

Then, in step S712, the AF signal processing unit 113 converts the amount of focus shift output in step S710 into the amount of defocus.

At this time, the relationship between the first number of amounts of correlation and the second number of amounts of correlation is such that the first number of amounts of correlation is less than or equal to the second number of amounts of correlation. That is, even if the number of first areas to be added in the column direction is small, the number of amounts of correlation to be added is increased, whereby it is possible to improve the accuracy of the calculation result of a correlation calculation.

Further, for example, in a case where AF control using a known face detection function (not illustrated) is executed, the focus detection area is always set at the face position of a person. Thus, even if the focus detection area becomes larger, it is highly likely that the same object is captured. In this case, the number of pixels based on which signals are added together in the column direction may always be the same. On the other hand, in a case where the size of the focus detection area is specified by the user, there is also a possibility that the same object is not captured. Thus, the number of pixels based on which signals are added together in the column direction may be reduced.

According to the above, an area where focus detection signals are read and the setting of the size of the area are changed according to the size of a focus detection area, whereby it is possible to reduce unstable focusing due to object missing or the capturing of different objects.

[Significance of Addition in Steps S703 and S706]

In phase difference AF, in a case where an object having low contrast is captured, or an object having low illuminance is captured, there is a possibility that the levels of the A-image signal and the B-image signal become low. In such a case, it is difficult to obtain the steepness of the amount of correlation. This causes a decrease in the accuracy of the amount of defocus. Further, in the case of an object having low contrast, the object is also likely to be influenced by shading. Further, in a case where the object is captured in the state where the International Organization for Standardization (ISO) sensitivity is increased, an increase in noise reduces the S/N ratio. Thus, the accuracy of the amount of defocus decreases, and the reliability level of the amount of defocus decreases.

Further, also in a case where a blurred object is captured, the signal levels are similar to those in the state of an object having low contrast. Thus, it is difficult to determine whether a blurred object or an object having low contrast is captured.

In the present exemplary embodiment, as many signals as a predetermined number of pixels (the first number of pixels or the second number of pixels) of the area where focus detection signals are read in the focus detection area (the first area) are added together in the column direction. This reduces a decrease in the S/N ratio and facilitates the obtaining of the steepness of the amount of correlation.

Further, it is possible to obtain similar effects also by adding together a plurality of amounts of correlation output from the rows of the first area.

[Lens Driving Process]

Figure 4:
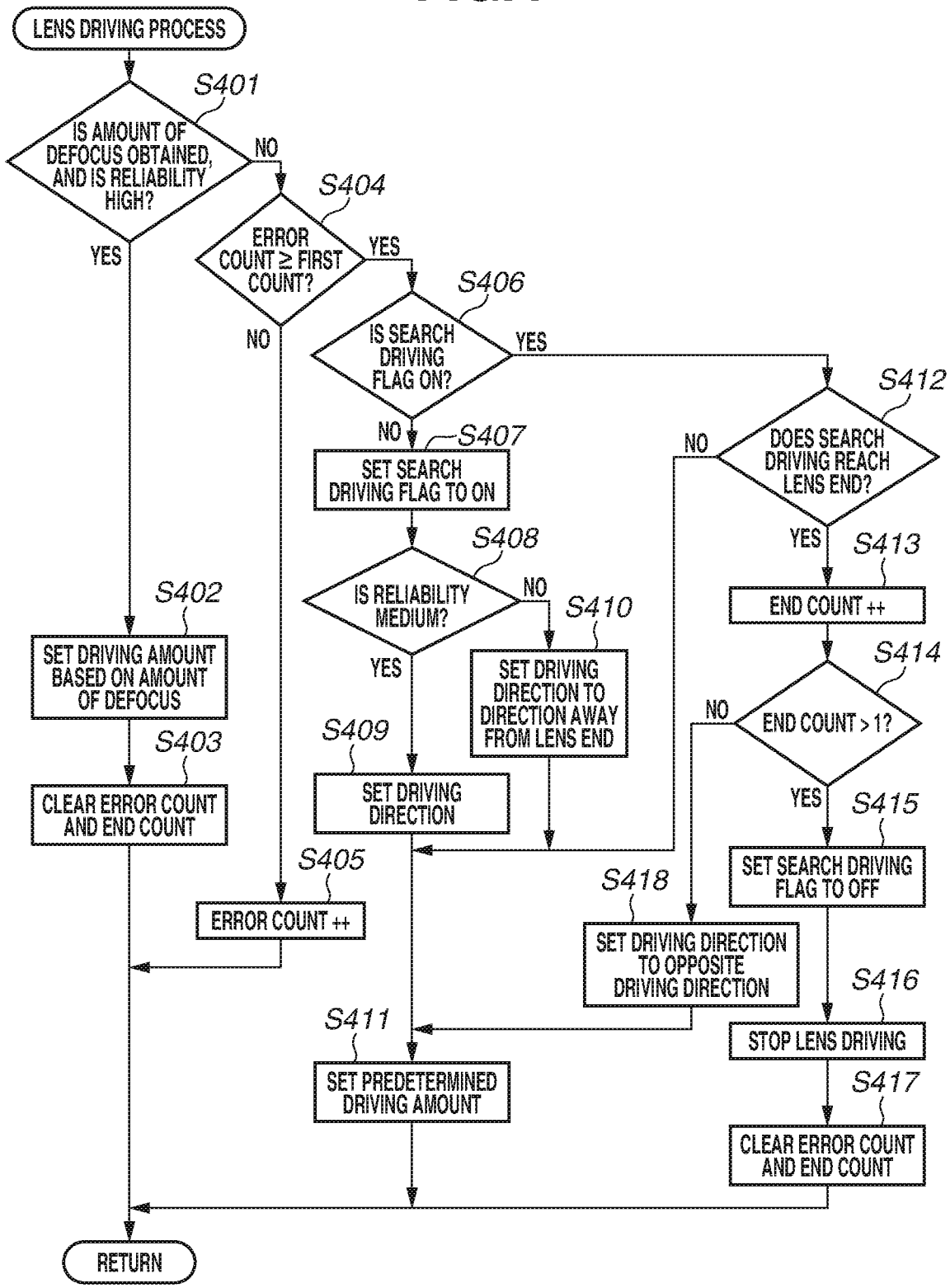
FIG. 4 is a diagram illustrating a lens driving process (a sub-flow).

FIG. 4 is a sub-flow illustrating the details of the lens driving process (step S309) in FIG. 3.

First, in step S401, the camera control unit 114 determines whether the amount of defocus is obtained, and the reliability level of the amount of defocus is high. If the amount of defocus is obtained, and the reliability level of the amount of defocus is high (YES in step S401), then in step S402, the camera control unit 114 determines a driving amount and a driving direction based on the amount of defocus.

Then, in step S403, the camera control unit 114 clears an error count and an end count, and the processing of this flow is ended.

If the amount of defocus is not obtained, or the reliability level of the amount of defocus is not high (NO in step S401), then in step S404, the camera control unit 114 determines whether the error count exceeds a first count. At this time, although not illustrated, the first count may be a value determined and stored in advance in a non-volatile memory. In the present exemplary embodiment, as an example, a value equal to or greater than twice a second count is set as the first count.

If the camera control unit 114 determines that the error count is less than or equal to the first count (NO in step S404), then in step S405, the camera control unit 114 counts up the error count, and the processing is ended.

If the camera control unit 114 determines that the error count is greater than the first count (YES in step S404), then in step S406, the camera control unit 114 determines whether a search driving flag is on.

If the camera control unit 114 determines in step S406 that the search driving flag is off (NO in step S406), this is not the state where a search operation is started, or a search is currently performed. In response, in step S407, the camera control unit 114 sets the search driving flag to on. Then, in step S408, the camera control unit 114 determines whether the reliability level of the amount of defocus is "medium".

If the camera control unit 114 determines that the reliability is "medium" (YES in step S408), then in step S409, the camera control unit 114 sets the driving direction using a defocus direction. Then, in step S411, the camera control unit 114 sets a predetermined driving amount. At this time, the camera control unit 114 performs search driving for driving the focus by the predetermined amount in the obtained defocus direction without driving the focus based on the absolute value itself of the amount of defocus.

If the camera control unit 114 determines that the reliability is not "medium" (NO in step S408), then in step S410, the camera control unit 114 sets the driving direction to a direction away from the lens end. Then, in step S411, the camera control unit 114 sets the predetermined driving amount.

As the predetermined driving amount in step S411, a value determined and stored in advance in a non-volatile memory may be used. For example, the driving amount is set to a distance several times the depth of focus. Alternatively, the driving amount may be variable according to the focal length. For example, the driving amount may be such that the longer the focal length, the greater the driving amount. The search driving direction at this time is, for example, the direction in which the lens end is distant from the current focus position.

If the camera control unit 114 determines that the search driving flag is on (YES in step S406), this is the state where search driving is already executed. Thus, the camera control unit 114 continues to execute the previous focus control. Then, in step S412, the camera control unit 114 determines whether the search driving reaches the lens end, which is the limitation position of lens driving when focus control is performed. If the search driving reaches the lens end (YES in step S412), then in step S413, the camera control unit 114 counts up the end count.

If the camera control unit 114 determines that the end count exceeds a predetermined value (YES in step S414), it is indicated that a credible amount of defocus cannot be obtained even by moving the focus lens 105 from a close end to an infinite end. Thus, the camera control unit 114 determines that there is no object that can be brought into focus. Then, in step S415, the camera control unit 114 sets the search driving flag to off. In step S416, the camera control unit 114 performs control so that the lens driving is stopped. Then, in step S417, the camera control unit 114 clears the error count and the end count, and the processing of this flow is ended.

If the camera control unit 114 determines that the end count does not exceed the predetermined value (NO in step S414), then in step S418, the camera control unit 114 sets the driving direction of the lens involved in the focus control to a driving direction opposite to the current driving direction. Then, in step S411, the camera control unit 114 sets the predetermined driving amount.

[Effects of First Exemplary Embodiment]

As described above, in the first exemplary embodiment, in a case where the number of rows in which signals are read from the image sensor 106 by the first reading control is the same, if a focus detection area larger than a predetermined size is set, the number of first areas in the image sensor 106 is increased. Further, the number of rows in which signals are read by the first reading control in each first area is reduced, thereby making the first area smaller in the column direction.

In other words from a different viewpoint, in a case where the number of rows in which signals are read from the image sensor 106 by the first reading control is the same, the number of rows in which signals are read by the first reading control in each first area is not changed, and the second area is not made equal to or larger than a predetermined size in the column direction. To this end, the respective numbers of first and second areas and the respective sizes in the column direction of the first and second areas are set according to the size of a set focus detection area.

Consequently, it is possible to prevent the second area from becoming equal to or larger than the predetermined size. That is, it is possible to prevent an object from coming out to the second area. Thus, according to the first exemplary embodiment, it is easy to adjust focus detection to a main object even if the size of the focus detection area is changed.

A description is given below of a second exemplary embodiment, which is a variation of the first exemplary embodiment.

The second exemplary embodiment is different from the first exemplary embodiment in that it is assumed that the size in the column direction of the first area is constant.

Further, in the first exemplary embodiment, the area where focus detection signals are read in the focus detection area (the first area) and the area where focus detection signals are not read in the focus detection area (the second area) are alternately arranged. In contrast, the second exemplary embodiment is different from the first exemplary embodiment in that even though the first area and the second area are regularly arranged, a plurality of first areas are continuous. Portions similar to those of the first exemplary embodiment are not described, and the differences from the first exemplary embodiment are mainly described here.

Figure 8A:
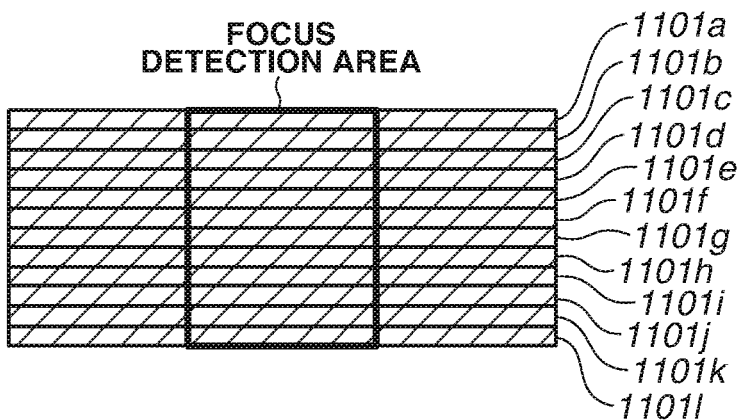
FIGS. 8A, 8B, and 8C are diagrams illustrating a focus detection signal reading area setting process in FIG. 5 in a second exemplary embodiment.
Figure 8B:
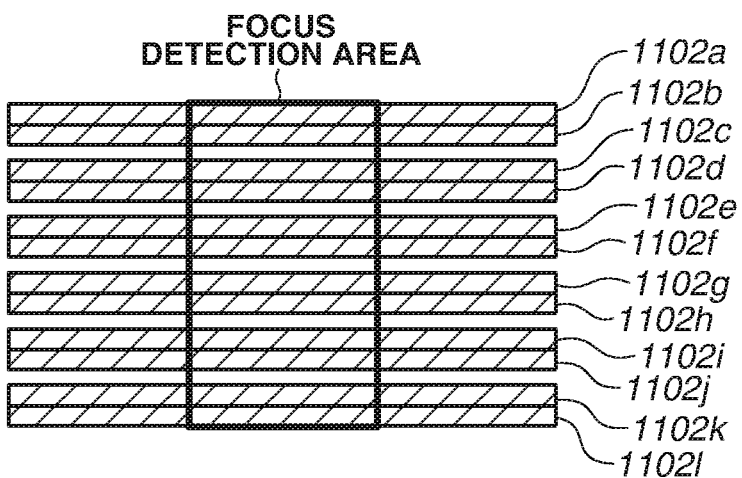
Figure 8C:
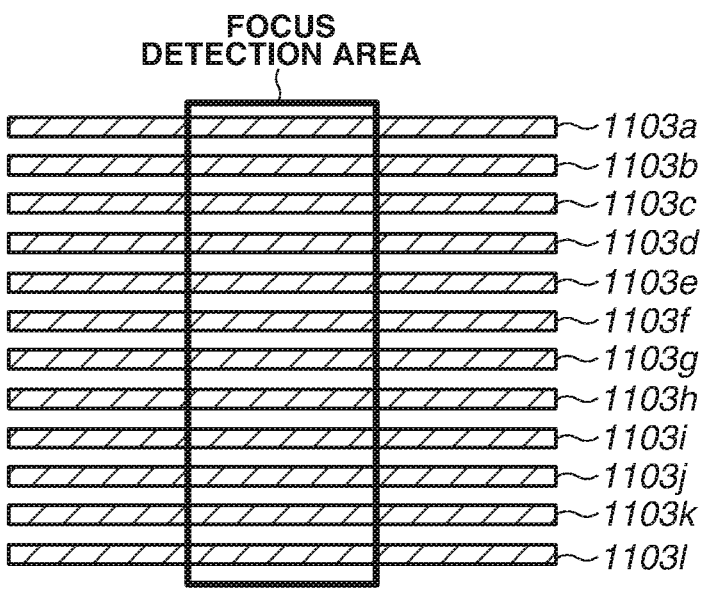

FIGS. 8A to 8B are diagrams illustrating images in steps S505 and S506 in FIG. 5 in the second exemplary embodiment. FIGS. 8B and 8C illustrate cases where the focus detection area is larger than that in FIG. 8A, namely 1.5 times that in FIG. 8A and twice that in FIG. 8A, respectively.

In FIGS. 6A to 6C, the size in the column direction of the first area included in the focus detection area is different between FIGS. 6A and 6B. In FIGS. 8A, 8B, and 8C, however, it is assumed that the size in the column direction of the first area included in the focus detection area is constant. For example, an area 1101a in FIG. 8A, an area 1102a in FIG. 8B, and an area 1103a in FIG. 8C are of the same size in the column direction.

Further, in FIG. 6B, unlike FIG. 6A, a plurality of first areas and a plurality of second areas are set by alternately arranging each first area and each second area. In FIG. 8B, unlike FIG. 8A, a plurality of continuous first areas and a second area are regularly set.

If each first area (phase difference detection area) and each second area are simply alternately arranged according to the size of the focus detection area as in the first exemplary embodiment, there is a case where different objects are captured in the first areas depending on the size of the second area, which is the space between the first areas, or the positions of the objects. If different objects are captured in different first areas, the first areas of which the amounts of correlation are added together in steps S705 and S708 correspond to the different objects. Thus, there is a case where the discrepancy between the calculated focus detection result and the proper focus detection result becomes large. Thus, in the second exemplary embodiment, a plurality of first areas are continuously set in the column direction. Consequently, it is highly likely that the same object can be captured in the continuous first areas. Thus, the accuracy of the focus detection result becomes higher. In the second exemplary embodiment, similarly to the first exemplary embodiment, the amount of correlation is calculated from each first area, and focus detection is performed based on the added amount of correlation obtained by adding the amounts of correlation. Thus, the more the first areas where a desired object to be brought into focus is captured, the closer the added amount of correlation is to a proper amount of correlation for bringing a desired object into focus. Thus, a plurality of first areas are made continuous so that the same object can be captured, whereby it is possible to perform focus detection using signals read from areas of an object more intended by the user than in the conventional art.

[Amount-of-Defocus Calculation Process in Second Exemplary Embodiment]

FIG. 9 is a flowchart illustrating an amount-of-defocus calculation process in a case where the first area is set as described with reference to FIGS. 8A to 8B.

First, in step S1201, the AF signal processing unit 113 acquires focus detection signals (the A-image signal and the B-image signal) corresponding to the area where focus detection signals are read in the focus detection area (the first area).

Next, in step S1202, among the signals read from the rows of each first area in step S1201, the AF signal processing unit 113 adds as many signals as a predetermined number of pixels together in the column direction. At this time, the predetermined number of pixels may be the smallest number of pixels that makes the accuracy of the detection result reliable in phase difference detection in an object having contrast. As an example, the predetermined number of pixels is 8 pixels.

In step S1203, based on the image signals calculated by the addition in step S1202, the AF signal processing unit 113 calculates the amount of correlation of each first area.

In step S1204, among the amounts of correlation calculated regarding the respective first areas in step S1203, the AF signal processing unit 113 adds a plurality of amounts of correlation together, thereby calculating the added amount of correlation. The number of amounts of correlation to be added together at this time is constant regardless of the size of the focus detection area.

Then, in step S1205, the AF signal processing unit 113 calculates the amount of change in correlation from the added amount of correlation. Then, in step S1206, the AF signal processing unit 113 calculates the amount of focus shift from the calculated amount of change in correlation.

Further, in step S1207, the AF signal processing unit 113 calculates a reliability level indicating how reliable the calculated amount of focus shift is.

Then, in step S1208, the AF signal processing unit 113 converts the amount of focus shift output in step S1206 into the amount of defocus.

At this time, for example, in a case where AF control using a known face detection function (not illustrated) is executed, the focus detection area is always set at the face position of a person. Thus, even if the focus detection area becomes larger, it is highly likely that the same object is captured. In this case, the number of pixels based on which signals are added together in the column direction may always be the same. On the other hand, in a case where the size of the focus detection area is specified by the user, there is also a possibility that the same object is not captured. Thus, the number of pixels added together in the column direction may be reduced.

In the second exemplary embodiment, as an example, the first number of pixels is 16 pixels, and the second number of pixels is 8 pixels. These numbers, however, are not limited to this example. The first number of pixels only needs to be greater than the second number of pixels.

[Effects of Second Exemplary Embodiment]

As described above, in the second exemplary embodiment, a plurality of continuous first areas and a second area are regularly arranged. Consequently, it is easy to capture the same object in the plurality of first areas continuously set (FIGS. 8A and 8B). Further, in a case where the size of the second area is equal to or great than a predetermined size, a plurality of first areas and a plurality of second areas are set by alternately arranging each first area and each second area (FIG. 8C). This can prevent an object from coming out to the space between first areas. Thus, it is possible to adjust focus detection to a main object even if the size of the focus detection area is changed.

A description is given below of a third exemplary embodiment, which is a variation of the first exemplary embodiment.

Figure 10:
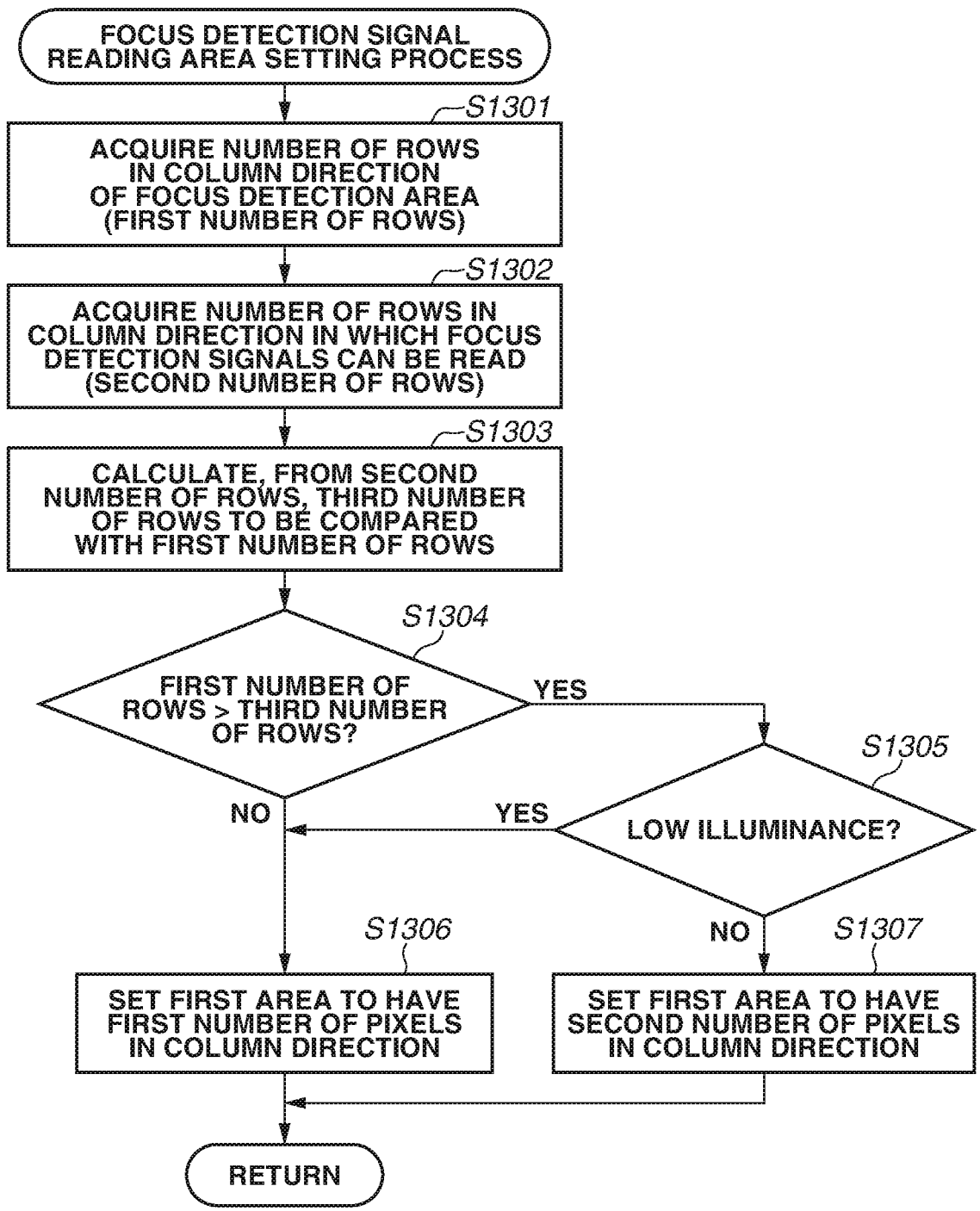
FIG. 10 is a diagram illustrating the focus detection signal reading area setting process (a sub-flow) in the second exemplary embodiment.

The third exemplary embodiment is different from the first exemplary embodiment in that in a flow in FIG. 10, which corresponds to FIG. 5 in the first exemplary embodiment, it is determined whether illuminance is low between steps S504 and S506. Portions similar to those of the first exemplary embodiment are not described, and the differences from the first exemplary embodiment are mainly described here.

FIG. 10 is a diagram illustrating a sub-flow of a focus detection signal reading area setting process in the third exemplary embodiment.

In steps S1301 to S1304, processes similar to those of steps S501 to S504 in the first exemplary embodiment are performed. Thus, steps S1301 to S1304 are not described here.

If the camera control unit 114 determines that the first number of rows is less than or equal to the third number of rows (NO in step S1304), then in step S1306, the camera control unit 114 sets the area where focus detection signals are read in the focus detection area (the first area) to an area continuous by the first number of pixels in the column direction.

If, on the other hand, the camera control unit 114 determines that the first number of rows is greater than the third number of rows (YES in step S1304), then in step S1305, the camera control unit 114 determines whether an object having low illuminance is captured.

If the camera control unit 114 determines that an object having low illuminance is captured (YES in step S1305), then in step S1306, the camera control unit 114 sets the area where focus detection signals are read in the focus detection area (the first area) to an area continuous by the first number of pixels in the column direction. At this time, the camera control unit 114 performs control so that the area where focus detection signals are read in the focus detection area (the first area) and the area where focus detection signals are not read in the focus detection area (the second area) are regularly arranged.

If, on the other hand, the camera control unit 114 determines that an object having low illuminance is not captured (NO in step S1305), then in step S1307, the camera control unit 114 sets first areas continuous by the second number of pixels in the column direction, at regular intervals in the focus detection area.

At this time, the determination of whether an object having low illuminance is captured may be made, for example, based on whether the state of the ISO sensitivity set by the user is greater than a predetermined value. Alternatively, the determination may be made based on whether the luminance value of a captured video image is smaller than a predetermined value. The determination is not limited to this so long as a method capable of determining the illuminance of an object is used.

When a phase difference is detected, the amount of defocus is calculated by adding pixels together in the column direction or adding the amounts of correlation together in the column direction.

The reason for this is as follows. In a case where an object having low illuminance is captured, there is a possibility that the levels of the A-image signal and the B-image signal become low as described above. In such a case, it is difficult to obtain the steepness of the amount of correlation. This causes a decrease in the accuracy of the amount of defocus. Further, in a case where an object is captured in the state where the ISO sensitivity is increased, an increase in noise reduces the S/N ratio. Thus, the accuracy of the amount of defocus decreases, and the reliability level of the amount of defocus decreases.

Thus, it is necessary to improve the S/N ratio by increasing or not reducing the number of pixels based on which signals are added together in the column direction in the first area, or increasing the amounts of correlation to be added together. Thus, in a case where it is determined in advance that an object having low illuminance is captured, and even if the focus detection area becomes larger, control is executed by giving priority to the output of a reliable amount of defocus.

[Effects of Third Exemplary Embodiment]

As described above, in the third exemplary embodiment, in a case where an object has low illuminance, the area where focus detection signals are read in the focus detection area (the first area) is set to an area continuous in the column direction by the first number of pixels that is greater than the second number of pixels, regardless of the size of the focus detection area. Consequently, it is possible to obtain the effect that the amount of correlation can be calculated with higher accuracy even in a case where an object has low illuminance, in addition to the effects of the first exemplary embodiment.

Other Exemplary Embodiments

In the first exemplary embodiment, a case has been described where the camera control unit 114 (the reading control unit) sets a plurality of first areas and a plurality of second areas by alternately arranging each first area and each second area. Alternatively, the first areas may be made continuous in the column direction and set in the center of the focus detection area until the focus detection area reaches a predetermined size. That is, the first areas may be set in the center, and the second areas may be provided above and below the first areas. Consequently, it is highly likely that the same object can be captured in the first areas.

Figure 11A:
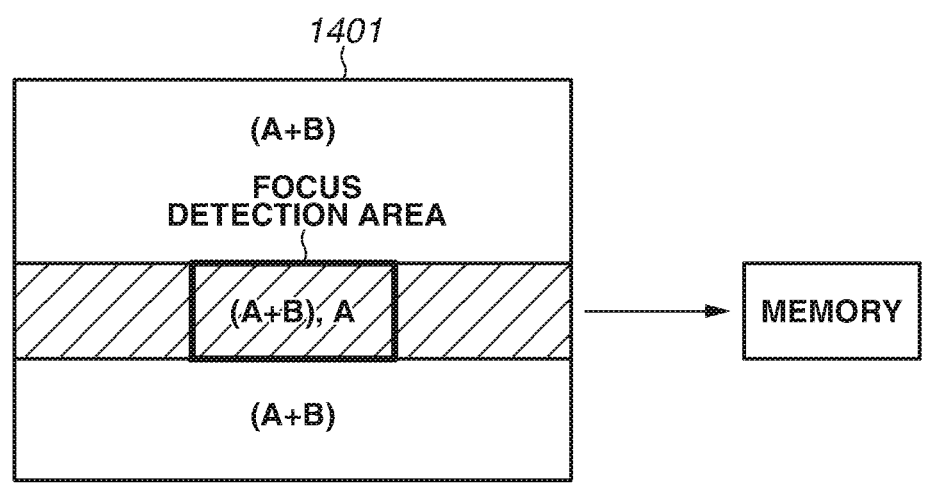
FIGS. 11A and 11B are image diagrams regarding acquisition of signals for focus detection from the image sensor.
Figure 11B:
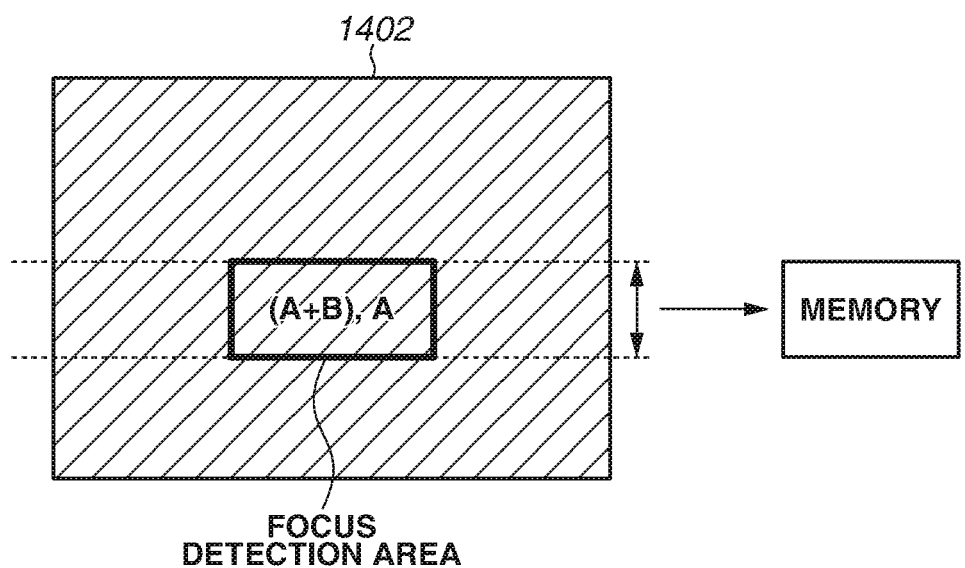
Figure 12:
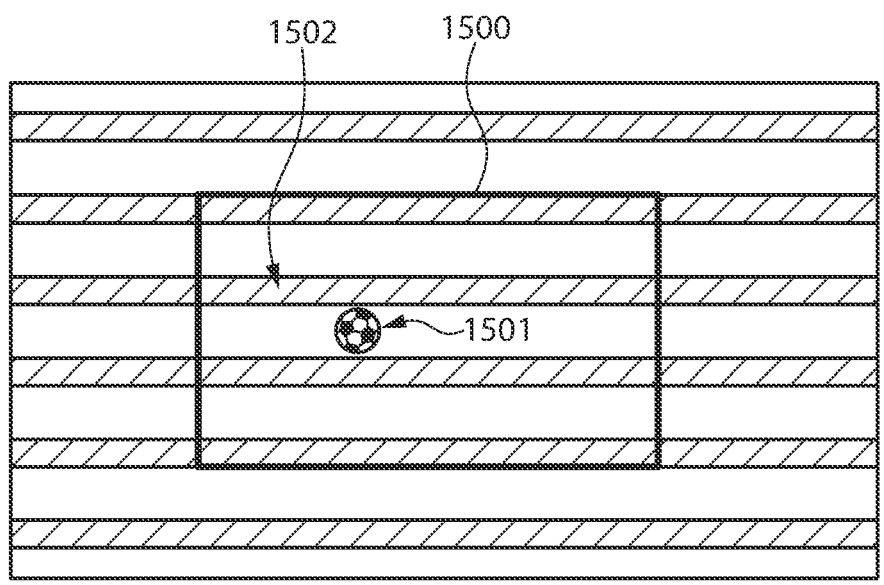
FIG. 12 is a diagram illustrating deficiencies in a conventional technique for performing imaging plane phase difference focus detection.

In the first to third exemplary embodiments, a case has been described where focus detection signals are read only from a partial area of the image sensor 106 (FIG. 11A). Alternatively, focus detection signals may be read from the entire imaging area of the image sensor 106, and some of the focus detection signals may be held according to the capacity of a volatile memory (not illustrated) when the focus detection signals are temporarily held (FIG. 11B). The first to third exemplary embodiments can be applied in either case. FIGS. 11A and 11B illustrate entire imaging areas 1401 and 1402 where signals can be read from the image sensor 106, and shaded portions indicate areas where both an image signal (A+B) and a focus detection signal A (or B) are read.

Further, the first and second exemplary embodiments may be combined together. For example, if the size of the focus detection area is less than or equal to a predetermined size, the determination of whether to make a plurality of first areas continuous is varied according to the size of the focus detection area without changing the size in the column direction of the first area and the number of first areas as in the second exemplary embodiment. Then, in a case where the focus detection area becomes larger than the predetermined size, and it is determined that if the first area and the second area are alternately arranged without changing the size in the column direction of the first area and the number of first areas as in FIG. 8C, an object will enter the second area, processing is performed as in the first exemplary embodiment. That is, the size in the column direction of the first area is made smaller, and the number of first areas is increased. Consequently, it is possible to obtain effects similar to those of the first and second exemplary embodiments.

Further, in a case where the number of first areas is great as in FIGS. 6B and 8C, the number of the amounts of correlation to be calculated also increases as compared with a case where the number of first areas is not great. Thus, it takes more time to calculate the amount of defocus. As a result, it increases the time taken until an object comes into focus. Thus, in a case where the number of first areas increases as in FIG. 6B, the camera control unit 114 may perform control so that the amount of shifting is made smaller than in the state of FIG. 6A, thereby shortening the time required to calculate the amount of correlation. Consequently, control is performed so that the time required to calculate the amount of defocus is equal between, for example, a case where the number of first areas is great and a case where the number of first areas is not great, whereby it is possible to perform stable focusing such that the responsiveness until focusing is not changed.

Further, generally, in a case where the amount of shifting is made smaller as described above, when the amount of defocus is great, i.e., an object is greatly blurred, it is more difficult to detect the amount of defocus than when the amount of defocus is not great. If the amount of defocus cannot be detected, it may take more time until focusing than in a case where the amount of defocus can be detected. Thus, in a case where the amount of defocus cannot be calculated, the camera control unit 114 may perform control so that the amount of shifting is not made smaller even in a case where the number of first areas is great, whereby the time until focusing does not differ. In this case, if the amount of defocus that can be calculated in a case where the amount of shifting is made smaller is calculated, the amount of shifting is made smaller.

Further, in the first to third exemplary embodiments, in a case where focus detection signals are read from a partial area of the image sensor 106, the higher the frame rate, the narrower the reading band. Thus, in a case where the frame rate is high, the second number of rows in which focus detection signals can be read is smaller than in a case where the frame rate is low. That is, the higher the frame rate, the more likely the assumed in the first to third exemplary embodiments arises. Thus, according to the frame rate, the camera control unit 114 may determine whether to carry out the first to third exemplary embodiments. For example, if the frame rate is so low that it can be determined that the second number of rows in which focus detection signals can be read is sufficiently great (a second frame rate), the processing of the first to third exemplary embodiments may not be performed on the assumption that the assumed in the first to third exemplary embodiments is less likely to arise. In this case, in a case where the frame rate is a first frame rate higher than the second frame rate, the processing of the first to third exemplary embodiments is performed.

Further, in the first to third exemplary embodiments, in a case where the frame rate is high, the third number of rows may be made smaller than in a case where the frame rate is low.

Further, the second number of rows may be represented by a proportion to all the number of rows in the column direction of the imaging area of the image sensor 106, and according to this proportion, it may be determined whether the above control is to be performed. For example, in a case where the second number of rows is in a predetermined proportion to all the number of rows, it is determined that the above control is not to be performed. The predetermined proportion may be determined based on the number of rows that allows phase difference detection areas to be placed at predetermined intervals in a case where the first area is set to be continuous by a predetermined number of pixels. For example, if the number of rows in the column direction of pixels for focus detection that can be set allows the reading of 20% of all the number of rows in the column direction, the above control is not performed.

Further, in the first to third exemplary embodiments, if the size of the second area does not become equal to or larger than a predetermined size in the column direction, and the size of the first area is equal to or larger than a size in the column direction that can be tolerated in terms of the illuminance of an object and the S/N ratio, the sizes in the column direction of a plurality of first areas may be varied in the focus detection area. As an example, the size in the column direction of a first area close to the center of the focus detection area may be larger than that of a first area that is not close to the center of the focus detection area.

In the above exemplary embodiment, as an example, a case has been illustrated where the camera control unit 114 performs control based on the detection result of the AF signal processing unit 113 outside the image sensor 106. Alternatively, the image sensor 106 may include a component corresponding to the AF signal processing unit 113 and a component corresponding to the camera control unit 114. Consequently, for example, a laminated sensor can also achieve the invention of the above exemplary embodiments.

Further, in the exemplary embodiments, a description has been given using an example where each pixel includes a microlens and a pair of photoelectric conversion units, and the photoelectric conversion units receive light from different lens pupils. The present invention, however, is not limited to such a configuration. For example, the configuration may be such that each pixel includes a microlens and a single photoelectric conversion unit placed behind the microlens, and some pixels and other pixels receive light from different lens pupils.

Further, the configuration may be such that focus detection signals are obtained by detecting high-frequency components from signals obtained from respective rows. In this case, a selection may be made about which row a high-frequency component is to be detected from.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
   an image sensor including a pair of photoelectric conversion units for each of a plurality of microlenses arranged in a matrix of rows and columns, and capable of reading a signal from each row; and
   at least one processor configured to perform the operations of the following units;
   a reading control unit configured to perform control so that a first area having a first predetermined number of rows in which signals are read by first reading control for reading signals for use in focus detection when signals are read from the image sensor, and a second area having a second predetermined number of rows in which signals are read without performing the first reading control, are regularly set on the image sensor; and
   a calculation unit configured to perform phase difference focus detection using, among the signals read by the first reading control, a pair of focus detection signals obtained from an area on the image sensor corresponding to a set focus detection area,
   wherein in a case where the number of rows in which signals are read from the image sensor by the first reading control is not changed, and in a case where a second focus detection area larger in a column direction than a first focus detection area is set, the reading control unit arranges a plurality of the first areas so as to be placed next to each other without changing, from a case where the first focus detection area is set, the number of rows in which signals are read by the first reading control in each of the first areas.

2. The imaging apparatus according to claim 1,
   wherein a first number of rows, which is the number of rows of a focus detection area, is less than or equal to a third number of rows in the case of the first focus detection area and is greater than the third number of rows in the case of the second focus detection area, and
   wherein the third number of rows is the number of rows based on a second number of rows, which is the number of rows in which signals are read by the first reading control.

3. The imaging apparatus according to claim 1,
   wherein the image sensor includes a pixel portion including the pair of photoelectric conversion units corresponding to each of the plurality of microlenses, and
   wherein the imaging apparatus further comprises at least one processor configured to perform the operations of a signal addition control unit configured to control addition of signals read by the first reading control in each of the first areas.

4. The imaging apparatus according to claim 3, wherein the calculation unit calculates an amount of correlation of each of the first areas using a signal obtained by the addition corresponding to the first area and performs focus detection using an added amount of correlation obtained by adding together the amounts of correlation calculated from the plurality of respective first areas in the focus detection area.

5. The imaging apparatus according to claim 4, wherein in a case where the reading control unit increases the number of the first areas and reduces the number of rows in which signals are read by the first reading control in each of the first areas, thereby making the first area smaller in the column direction, and when the calculation unit calculates the amount of correlation by shifting the signal obtained by the addition, the reading control unit reduces an amount of the shifting.

6. The imaging apparatus according to claim 1, wherein in a case where illuminance of an object is lower than a predetermined value, and even in a case where the second focus detection area larger in the column direction than the first focus detection area is set, the reading control unit does not increase the number of rows in which signals are read by the first reading control in each of the first areas, and a size in the column direction of the first area is the same.

7. The imaging apparatus according to claim 1, wherein in a case where a frame rate of the image sensor is a first frame rate, and in a case where the second focus detection area is set, then without changing the number of rows in which signals are read from the image sensor by the first reading control, the number of the first areas is made larger than in the case where the first focus detection area is set, and the number of rows in which signals are read by the first reading control in each of the first areas is reduced to make the first area smaller in the column direction than in the case where the first focus detection area is set.

8. A method for controlling an imaging apparatus including an image sensor including a pair of photoelectric conversion units for each of a plurality of microlenses arranged in a matrix of rows and columns, and capable of reading a signal from each row, the method comprising:
   performing control so that a first area having a first predetermined number of rows in which signals are read by first reading control for reading signals for use in focus detection when signals are read from the image sensor, and a second area having as many rows a second predetermined number of rows in which signals are read without performing the first reading control, are regularly set on the image sensor; and
   performing phase difference focus detection using, among the signals read by the first reading control, a pair of focus detection signals obtained from an area on the image sensor corresponding to a set focus detection area,
   Wherein, in the performing control, in a case where the number of rows in which signals are read from the image sensor by the first reading control is not changed, and in a case where a second focus detection area larger in a column direction than a first focus detection area is set, a plurality of the first areas are arranged next to each other without changing, from a case where the first focus detection area is set, the number of rows in which signals are read by the first reading control in each of the first areas.

* * * * *